(12) United States Patent
McCallister et al.

(10) Patent No.: US 12,092,186 B2
(45) Date of Patent: *Sep. 17, 2024

(54) METHOD OF CONTROLLING PRESSURE VARIATION IN WORKING FLUIDS IN A FLUID CIRCUIT UNDERGOING WORKING PRESSURE VARIATIONS

(71) Applicant: Holmes Solutions Limited Partnership, Wellington (NZ)

(72) Inventors: John McCallister, Christchurch (NZ); Mark Thomson, Christchurch (NZ); Murray Aitken, Christchurch (NZ); Stuart Clark, Christchurch (NZ)

(73) Assignee: Holmes Solutions Limited Partnership, Wellington (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 18/112,059

(22) Filed: Feb. 21, 2023

(65) Prior Publication Data

US 2023/0204086 A1 Jun. 29, 2023

Related U.S. Application Data

(63) Continuation of application No. 17/183,647, filed on Feb. 24, 2021, now Pat. No. 11,598,387, which is a
(Continued)

(30) Foreign Application Priority Data

Mar. 15, 2015 (NZ) ........................ 705512

(51) Int. Cl.
*F16F 9/40* (2006.01)
*F15B 1/02* (2006.01)
(Continued)

(52) U.S. Cl.
CPC ................ *F16F 9/20* (2013.01); *F15B 1/021* (2013.01); *F15B 1/025* (2013.01);
(Continued)

(58) Field of Classification Search
CPC .... F16F 9/063; F16F 9/064; F16F 9/20; F16F 9/145; F16F 9/19; F16F 9/3405;
(Continued)

(56) References Cited

U.S. PATENT DOCUMENTS 698,483 A 4/1902 Faith et al.
776,061 A 11/1904 Hewett et al.
(Continued)

FOREIGN PATENT DOCUMENTS

CN 1098174 A 2/1995
CN 101479498 A 7/2009
(Continued)

OTHER PUBLICATIONS

Extended European Search Report and Search Opinion received in EP16765323.7, dated Dec. 19, 2018, 7 pages.
(Continued)

*Primary Examiner* — Bradley T King
(74) *Attorney, Agent, or Firm* — ARC IP Law, PC; Joseph J. Mayo

(57) ABSTRACT

Described herein is a fluid circuit device. The device incorporates at least one pressure balancing valve located between at least two fluid volumes that can be in a pressure differential arrangement wherein the at least one pressure balancing valve acts to address a pressure differential by opening a fluid volume or volumes to a third pressure equalising volume. In use, the fluid circuit device may in one embodiment be used in an energy absorbtion apparatus.

17 Claims, 3 Drawing Sheets

Related U.S. Application Data continuation of application No. 15/559,000, filed as application No. PCT/NZ2016/050038 on Mar. 15, 2016, now Pat. No. 10,948,044.

(51) Int. Cl.

| | | |
|---|---|---|
| *F15B 15/14* | (2006.01) | |
| *F15B 15/20* | (2006.01) | |
| *F16F 9/19* | (2006.01) | |
| *F16F 9/20* | (2006.01) | |
| *F16F 9/34* | (2006.01) | |
| *F16F 9/46* | (2006.01) | |
| *F16F 15/023* | (2006.01) | |
| *E04H 9/02* | (2006.01) | |

(52) U.S. Cl.
CPC ........ *F15B 15/1457* (2013.01); *F15B 15/204* (2013.01); *F16F 9/19* (2013.01); *F16F 9/3405* (2013.01); *F16F 9/46* (2013.01); *F16F 15/023* (2013.01); *E04H 9/0215* (2020.05); *F16F 2230/30* (2013.01)

(58) Field of Classification Search
CPC ....... F16F 15/023; F15B 1/025; F15B 13/029; F16K 11/044; F16K 11/048
See application file for complete search history.

(56) References Cited

U.S. PATENT DOCUMENTS

| | | | |
|---|---|---|---|
| 1,087,017 A | | 2/1914 | Houdaille |
| 1,141,246 A | | 6/1915 | Houdaille |
| 2,357,278 A | | 8/1944 | O'Connor |
| 2,388,755 A | | 11/1945 | McLeod |
| 2,495,516 A | | 1/1950 | Foster |
| 2,604,953 A | | 7/1952 | Campbell |
| 2,680,016 A | | 6/1954 | McLeod |
| 2,771,968 A | | 11/1956 | Mercier |
| 3,026,903 A | | 3/1962 | Roach |
| 4,084,668 A | | 4/1978 | Rybicki |
| 4,271,938 A | | 6/1981 | Berger |
| 4,695,226 A | | 9/1987 | Marchitto et al. |
| 4,786,034 A | | 11/1988 | Heess et al. |
| 4,850,461 A | * | 7/1989 | Rubel ..................... F16F 9/466 188/282.1 |
| 5,147,018 A | | 9/1992 | Kobori et al. |
| 5,320,136 A | | 6/1994 | Morris et al. |
| 5,347,771 A | | 9/1994 | Kobori et al. |
| 5,477,947 A | | 12/1995 | Schalles et al. |
| 5,662,046 A | | 9/1997 | Wright |
| 6,068,451 A | | 5/2000 | Uppal |
| 6,536,565 B2 | | 3/2003 | Oliver et al. |
| 8,104,591 B2 | | 1/2012 | Barefoot |
| 9,080,630 B2 | * | 7/2015 | Richards .................. F16F 9/20 |
| 10,883,558 B2 | | 1/2021 | Isoda et al. |
| 10,948,044 B2 | | 3/2021 | McCallister et al. |
| 11,515,776 B2 | * | 11/2022 | Diehl .................... B60R 22/343 |
| 11,598,387 B2 | * | 3/2023 | McCallister ............. F16F 9/20 |
| 2003/0010587 A1 | | 1/2003 | Eroshenko |
| 2004/0020355 A1 | | 2/2004 | Shih |
| 2004/0134732 A1 | | 7/2004 | Mintgen et al. |
| 2010/0038179 A1 | | 2/2010 | Kimura |
| 2010/0193714 A1 | | 8/2010 | Hankinson et al. |
| 2014/0033909 A1 | | 2/2014 | Murphy et al. |

FOREIGN PATENT DOCUMENTS

| | | |
|---|---|---|
| FR | 2313603 | 10/2015 |
| JP | S51148168 | 12/1976 |
| JP | S55124607 A | 9/1980 |
| JP | S57127124 | 8/1982 |
| JP | S59147104 | 8/1984 |
| JP | 60073145 | 4/1985 |
| JP | 1999257405 A | 9/1999 |
| JP | H11257405 A | 9/1999 |
| JP | 2000274473 A | 10/2000 |
| JP | 2002106626 | 4/2002 |
| JP | 2003278704 | 10/2003 |
| JP | 2004347018 A | 12/2004 |
| JP | 2005331058 | 12/2005 |
| JP | 2009133411 A | 6/2009 |
| JP | 2010520433 | 6/2010 |
| JP | 2011027137 | 2/2011 |
| JP | 2011252599 | 12/2011 |
| JP | 2012197905 | 10/2012 |
| JP | 2014062578 A | 4/2014 |
| WO | 2010/141798 | 12/2010 |
| WO | 2013/112109 | 8/2013 |

OTHER PUBLICATIONS

Chinese Search Report received in CN107532674, Undated, 3 pages.
International Search Report and Written Opinion issued in PCT/NZ2016/050038, mailed May 24, 2016, 5 pages.
IPRP, PCT/NZ2016/050038, dated Jul. 17, 2017, 17 pages.
Supplementary European Search Report received in EP16765325, dated Nov. 21, 2018, 2 pages.

* cited by examiner

METHOD OF CONTROLLING PRESSURE VARIATION IN WORKING FLUIDS IN A FLUID CIRCUIT UNDERGOING WORKING PRESSURE VARIATIONS

This application is a continuation of U.S. patent application Ser. No. 17/183,647, filed on 24 Feb. 2021, which is a continuation of U.S. patent application Ser. No. 15/559,000, filed on 15 Sep. 2017, which is a 35 U.S.C. 371 National Stage Application of PCT/NZ2016/050038, filed on 15 Mar. 2016, which claims priority to New Zealand Application No. 705512, filed on 15 Mar. 2015, the specifications of which are hereby incorporated herein by reference.

BACKGROUND OF THE INVENTION

Field of the Invention

Described herein is a fluid circuit device. More specifically, a fluid circuit device is described incorporating at least one pressure balancing valve located between at least two fluid volumes in a pressure differential arrangement wherein the valve maintains a pressure equilibrium between the lower of the two volumes and a third pressure equalizing volume.

Description of the Related Art

Pressure fluid circuits have existed in the art for various applications such as in cooling or lubrication in engines. Relief of fluid pressure is known, however the use of inverse or inverted shuttle valves, which direct fluid from a first fluid side to a second fluid side, has not been widespread for all fluids and applications. Part of the problem has been providing a suitable mechanical configuration to suit a wide variety of fluids and provide high efficiency of operation. In addition, poor reliability from some configurations, for example those requiring sliding seals, mean that the art circuits and valves have not been used more widely.

Inverse shuttle valves (ISV) have been used in steam engines from the early 1900's as a valve to drain water from the low pressure side of the piston and were patented as automatic draining devices e.g. U.S. Pat. Nos. 1,574,103 and 776,061. However such steam engine usage was not used to address a pressure difference about a piston cylinder.

The use of inverse shuttle valves to balance a pressure difference in hydraulic circuits is known e.g. U.S. Pat. No. 8,132,588. However, their use within hydraulic cylinders is not ideal for applications such as cylinder-piston configuration where fast switching action and high pressure differential tolerances are required.

It should be appreciated that it may be useful to provide a fluid circuit device that provides an alternative means of addressing pressure variations or at least to provide the public with a choice.

Further aspects and advantages of the fluid circuit device will become apparent from the ensuing description that is given by way of example only.

BRIEF SUMMARY OF THE INVENTION

Described herein is a fluid circuit device that provides a means for controlling pressure variation in working fluids in a fluid circuit undergoing working pressure variation. The device may be useful where changes in internal volume or fluid expansion and contraction may be detrimental to the system if pressure is not balanced, such as with a hydraulic shock absorber (or damper).

In a first aspect, there is provided a fluid circuit device comprising:
  at least one first fluid volume and at least one second fluid volume operatively linked via a pressure varying relationship, wherein at least one pressure balancing valve fluidly links the at least one first fluid volume and the at least one second fluid volume to at least one third fluid volume; and,
  in use, when there is a pressure difference between the at least one first fluid volume and the at least one second fluid volume, the at least one pressure balancing valve acts to provide a fluid flow path between the at least one third volume and the lower pressure of either the first fluid volume or the second fluid volume.

In a second aspect, there is provided a method of controlling pressure variation in working fluids in a fluid circuit undergoing working pressure variation, the method comprising the steps of:
  (a) selecting a fluid circuit device substantially as described herein; and
  (b) integrating the device into an apparatus undergoing working pressure variation.

Examples of advantages of the above described fluid circuit device include some or all of the following:
  Minimises vacuum pressure inside the working volumes;
  Provides a tuneable flow behaviour and shut-off threshold;
  Ease of manufacture—it is possible to construct the device as either an insert cartridge or to have the device machined directly into a piston/chamber/volume;
  Low manufacturing tolerances—no honed or fitted passages or precision sliding components may be required in the above described design;
  Sliding seals can be avoided unlike art devices as the valves used in the devices herein can be manufactured without sliding seals;
  Fast dynamic switching action of the valve may allow the valve to be used in high speed dynamic applications;
  The described device may be mounted in dynamically moving components hence can meet flexible installation requirements;
  The device may be compact and may be machined directly into pre-existing components to provide a compact arrangement;
  High Pressure tolerance—it is possible to use the above described device with high pressure differentials;
  Debris tolerance—the above device may be manufactured to have large part clearance for debris tolerance where debris may interfere with operation.

BRIEF DESCRIPTION OF THE DRAWINGS

Further aspects of the fluid circuit device will become apparent from the following description that is given by way of example only and with reference to the accompanying drawings in which.

DETAILED DESCRIPTION OF THE INVENTION

Figure 1:
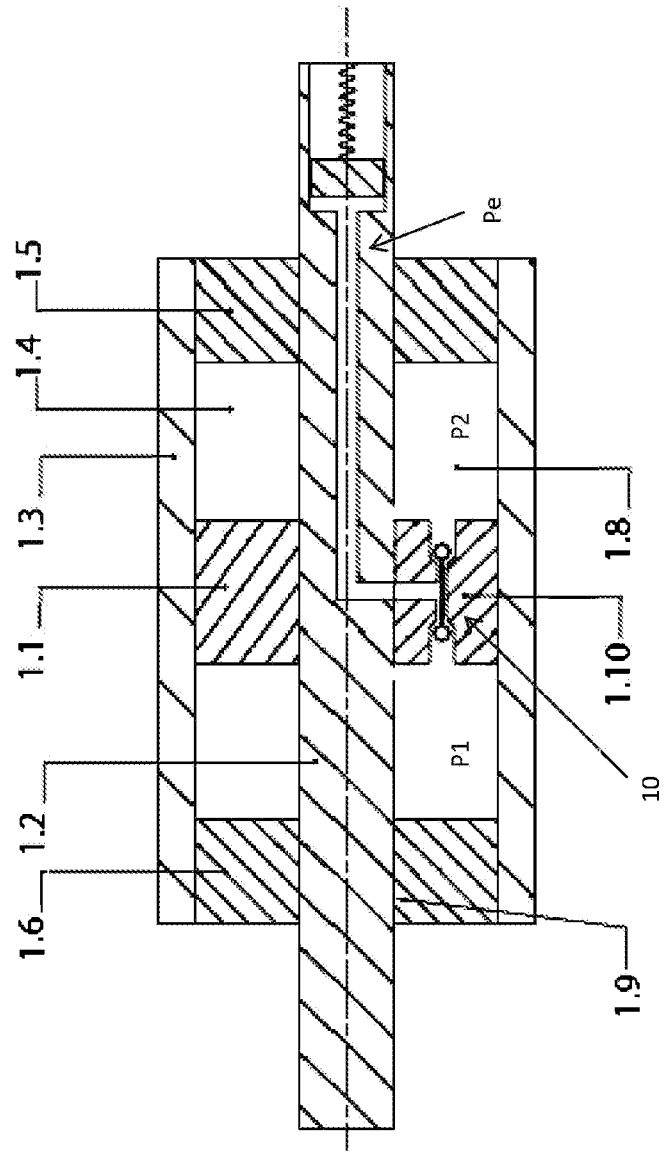
FIG. 1 illustrates a side elevation cross-section view of a first embodiment of a device incorporating a pressure balancing valve.

As noted above, described herein is a fluid circuit device that provides a means for controlling pressure variation in working fluids in a fluid circuit undergoing working pressure variation. The device may be useful where changes in internal volume or expansion or contraction may be detrimental to the system if the resulting pressure is not balanced.

For the purposes of this specification, the term 'about' or 'approximately' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'substantially' or grammatical variations thereof refers to at least about 50%, for example 75%, 85%, 95% or 98%.

The term 'comprise' and grammatical variations thereof shall have an inclusive meaning—i.e. that it will be taken to mean an inclusion of not only the listed components it directly references, but also other non-specified components or elements.

The term 'viscous damper' or grammatical variations thereof refers to a device that offers resistance to motion achieved predominantly through the use of viscous drag behaviours, such that energy is transferred when the damper undergoes motion. Although viscous drag behaviours are noted here, those skilled in the art will appreciate that other methods are possible and as such, this definition should not be seen as limiting. It may be used in applications where impact damping or oscillatory damping is beneficial.

The term 'hydraulic cylinder' or grammatical variations thereof refers to a device that imposes a coupling force between members within a cylinder at least partially via one or more hydraulic forces.

The term 'cylinder' or grammatical variations thereof as used herein refers to a cylinder with a bore therein along the longitudinal axis of the cylinder.

The term 'fastener' or grammatical variations thereof as used herein refers to a mechanical fastener that joins or affixes two or more objects together. As used herein, this term excludes simple abutting or facing of materials and typically refers to a part or parts joining or affixing through obstruction. Non-limiting examples of fasteners include screws, bolts, nails, clips, dowels, cam locks, rope, string or wire.

The term 'seal' or grammatical variations thereof refers to a device or arrangement of features acting to form a barrier between two fluid volumes.

In a first aspect, there is provided a fluid circuit device comprising:
at least one first fluid volume and at least one second fluid volume operatively linked via a pressure varying relationship, wherein at least one pressure balancing valve fluidly links the at least one first fluid volume and the at least one second fluid volume to at least one third fluid volume; and,
in use, when there is a pressure difference between the at least one first fluid volume and the at least one second fluid volume, the at least one pressure balancing valve acts to provide a fluid flow path between the at least one third volume and the lower pressure of either the first fluid volume or the second fluid volume.

The fluid circuit may be a closed circuit. That is, the circuit is sealed from an external environment and all changes in pressure are addressed within the fluid circuit device.

The third fluid volume noted above may be an accumulator. Fluid flow to the accumulator may be via a passage fluidly linked to the at least one first and/or second fluid volume. The accumulator may provide a volume reservoir for overflow and low pressure makeup fluid for volume compensation as volume changing movement/pressure change occurs about the first and second fluid volumes. The accumulator may also provide a volume reservoir during idle use when environmental influences affect the pressure, volume, and expansion characteristics of the device. In one embodiment the accumulator may comprise a tube linked to a larger reservoir and the reservoir may be located distal to the main apparatus e.g. a piston and cylinder assembly or incorporated within the main apparatus e.g. within the piston shaft. A key feature of this configuration may be that the accumulator is in communication with either or both sides of the chambers as noted above, via the valve.

For ease of description herein, the first and second volumes may be referred to interchangeably as first and second chambers and the third volume may be referred to as being a fluid accumulator. This should not be seen as limiting as to application as these associated volumes or chambers and accumulator may take various end configurations.

The at least one pressure balancing valve noted above may actuate, on application of a pressure gradient relative to the first fluid volume and the second fluid volume via a first volume changing movement to connect the third fluid volume and a low pressure first fluid volume and also restrict or close connection to a relatively higher pressure second fluid volume; and
in the event of a reversed pressure gradient imposed via a reversed volume changing movement relative to the first fluid volume and the second fluid volume, the third volume and first fluid volume connection is restricted or closed and a connection is made between the second fluid volume and the third fluid volume; and, wherein valve movement at least partially equalises the pressure gradient between the lower pressure of either the first fluid volume and the second fluid volume with the third fluid volume.

The volume changing movement may be a linear stroke movement. Alternatively, the volume changing movement may be an angular movement. In yet a further alternative, the volume changing movement may be a rotary movement. In addition to the above, a combination of volume changing movements may also be undertaken e.g. stroke and angular movement or stroke and rotary movement, or a combination of stroke, angular and rotary movement.

As noted above, movement of the valve may be from a pressure difference or gradient driving a volume changing movement action of the valve. The valve and/or the first and/or second chambers may move causing a change in valve position. For example, movement of the valve between sides may be driven at least in part by an inertia change causing the valve to respond. This inertia change may for example, be driven by valve housing (e.g. chamber) movement. The inertia of the valve may retard movement with the housing thereby causing the valve to remain static and therefore alter position relative to the housing.

Factors such as: valve size, inertia to movement, materials used, stiffness, flexibility, thermal conductivity and friction if any between materials; may be used to tune the dynamics and alter the speed, timing of movement and other stroke characteristics of valve movement between the limits of movement of the first and second valves. For example, movement may be tuned to have a smooth steady movement, or instead to have a delayed initial movement followed by a rapid movement, or alternatively, a rapid initial movement followed by a slowed cushioned final movement. Further, the valve action may be influenced by the integration of biasing elements to affect the motion behaviour of the valve such as urging movement in a particular direction or towards a specific position such as a neutral position.

In the event of a low or no pressure gradient between the first fluid volume and the second fluid volume, the at least one pressure balancing valve may permit connection between the first fluid volume, second fluid volume and third fluid volume, thereby allowing equilibration of pressure across all volumes in the fluid circuit. This may be useful to address volume changes caused by environmental factors (heat and cold) and thereby avoid unwanted pressure build up or loss when the device is at rest or not having a volume changing movement force imposed on the device. In this way, the valve may allow for fluid expansion or contraction due to environmental temperature variations. As may be appreciated, temperature variations may also provide another means of altering the valve position and providing pressure equilibration.

The at least one pressure balancing valve may be urged via at least one bias to a fluid flow restricted or closed position relative to at least one first or second fluid volume. As noted, full fluid flow closure may not be essential. Flow restriction may be sufficient.

The at least one pressure balancing valve may in one embodiment comprise an elongated pin element located in a housing which on movement within the housing contacts a first or second seal located at either extent of a housing, the first seal being in fluid communication with the first fluid volume and the second seal being in fluid communication with the second fluid volume. In this embodiment, the pin length in relation to the housing may be such that, on application of a pressure difference between the first fluid volume and the second fluid volume, the pin is urged to move to restrict or close either the first seal or second seal of the at least one pressure balancing valve while in turn unsealing the opposing seal.

The pin used to form the valve may be of an integral rigid structure. Alternatively, the pin may not be connected directly or integral and instead be formed from two sides, the sides linked via a third element such as a spring or other linkage. In a yet further embodiment, a solid pin may be used with a spring also integrated into the design. As should be appreciated, various valve/seal/pin configurations may be used to form the pin and to urge/retard/control movement of the valve and the examples provided should not be seen as limiting.

As noted above, the at least one pressure balancing valve may also comprise at least one bias that imposes a bias force. The bias force may be imposed on either or both the pin or seals to urge the valve to a neutral position to open access to the first fluid volume and second fluid volume until sufficient force is applied against the pin or seals to overcome the bias force. The bias may be imposed by at least one spring. The bias may be imposed by at least one magnet. Other bias imposing means may include electric solenoids and supplementary actuators. Reference to any one bias means noted should not be seen as limiting. The bias may be imposed by a combination of bias imposing elements such as a combination of both a spring and magnet. Incorporation of a bias may be important in some applications such as in a lock-up style viscous dampers where some flow between the fluid volumes or chambers may be important to permit fluid volume transfer between the first and second volumes at low transfer rates.

The seal or seals noted above may be used at one or both first or second fluid volume or chamber inlet/outlets. Seals may in one embodiment be located at either end of the shaft against the chamber or piston and may be formed via a check valve or ball valve arrangement although numerous other art valve systems may also be used.

At the interface between valve and chamber, the seal may be at least one compression face seal. The first seal and/or second seal may be a compression face seal. This may be useful as such seals have greater robustness and longevity than other types of seal. In one embodiment, sliding seals common in such device may be avoided through use of the above described device. Avoidance of sliding seals may be helpful as these types of seal are more complex, may have more reliability issues, and may require more maintenance than other types of seal e.g. compression seals.

The fluid may for example, be a hydraulic fluid, such as oil, hydrocarbon based fluids (e.g. diesel), brake fluid, power steering fluid, vegetable oil or water although a wide variety of fluids (liquids, semi-solids and gases) may be used.

In a second aspect, there is provided a method of controlling pressure variation in working fluids in a fluid circuit undergoing working pressure variation, the method comprising the steps of:
 (a) selecting a fluid circuit device substantially as described herein; and
 (b) integrating the device into an apparatus undergoing working pressure variation.

In one embodiment, the device may be used about a piston, the device being located between opposing sides of a piston seal inside a cylinder and, when the piston moves in the cylinder a pressure change occurs with fluid on one side of the piston being compressed (higher pressure) and fluid on the opposing side of the piston expanding (lower pressure). Excess high or low pressure may damage the device or system, hence dissipating the pressure at least to some extent particularly on the low pressure side, may be important to prevent damage and ensure continued reliability during and after a pressure change event.

The above fluid circuit device may also be used in an energy absorbtion device, examples including piston containing hydraulic cylinder or viscous damper apparatus.

In the application of a hydraulic cylinder, the valve may be located across the different sides of a piston head and the flow of fluid from either side of the piston or chamber into the fluid accumulator may be directed by the valve, allowing pressure to build up on the closed valve side of the piston and relieving a vacuum on the low pressure open side of the valve. The pressure build-up in the piston cavity may hold the valve closed. The open valve side of the piston is then free to equilibrate changes in fluid volume and pressure via the accumulator. The example of application in a piston head should not be seen as limiting as, for example, pressure equalising may be via an external tube not linked with a piston head.

In the case of viscous damper apparatus, the apparatus experiences rapid reciprocating movement and has to deal with dramatic force changes such as when used to absorb seismic energy in a building or structure. Dampers ideally utilise some means of pressure equilibration to address the sudden changes in pressure caused by piston movement, and the gradual changes from environmental influences. In addition, the fluid within a damper device becomes hot during a seismic event and the fluid also changes in volume due to diurnal variations in ambient temperature causing expansion (and contraction) in the working fluid volume. These changes ideally need to be addressed to avoid failure or a loss in reliability of the device. A valve such as that described herein has, in the inventor's experience, been critical to the success of damper design and reliable function.

Examples of advantages of the above described fluid circuit device include some or all of the following:
- Minimises vacuum pressure inside the working volumes;
- Provides a tuneable flow behaviour and shut-off threshold;
- Ease of manufacture—it is possible to construct the device as either an insert cartridge or to have the device machined directly into a piston/chamber/volume;
- Low manufacturing tolerances—no honed or fitted passages or precision sliding components may be required in the above described design;
- Sliding seals can be avoided unlike art devices as the valves used in the devices herein can be manufactured without sliding seals;
- Fast dynamic switching action of the valve may allow the valve to be used in high speed dynamic applications;
- The described device may be mounted in dynamically moving components hence can meet flexible installation requirements;
- The device may be compact and may be machined directly into pre-existing components to provide a compact arrangement;
- High Pressure tolerance—it is possible to use the above described device with high pressure differentials;
- Debris tolerance—the above device may be manufactured to have large part clearance for debris tolerance where debris may interfere with operation.

The embodiments described above may also be said broadly to consist in the parts, elements and features referred to or indicated in the specification of the application, individually or collectively, and any or all combinations of any two or more said parts, elements or features, and where specific integers are mentioned herein which have known equivalents in the art to which the embodiments relates, such known equivalents are deemed to be incorporated herein as of individually set forth, Where specific integers are mentioned herein which have known equivalents in the art to which this invention relates, such known equivalents are deemed to be incorporated herein as if individually set forth.

WORKING EXAMPLES

The above described fluid circuit device is now described by reference to specific examples. For ease of discussion, viscous dampers are described in the examples however the principles relating to a viscous damper may be applied to other fluid circuit containing devices as well, for example a piston and/or hydraulic cylinder apparatus. Reference to a viscous damper application should not be seen as limiting.

Example 1

Referring to FIG. 1 below, the viscous damper apparatus may in one embodiment consist of a piston 1.1 connected to a shaft 1.2, the piston assembly moving in a fitted cylinder 1.3 filled with a viscous fluid 1.4. The shaft passes through end caps 1.5, 1.6 at the open ends of the cylinder 1.3, where fluid sealing elements contain fluid (not shown) in the cavity 1.8 formed by the piston 1.1 and cylinder 1.3. Bearing elements 1.9 are present in the end caps 1.6 to support lateral loads between cylinder 1.3 and the shaft 1.2. Motion of the piston 1.1 in the cylinder 1.3 in response to external load or displacement (not shown) causes fluid pressure to be generated on a load side of the piston 1.1. The pressure difference across the piston 1.1 causes the fluid to flow across the annulus or piston head 1.10 formed between the piston 1.1 and cylinder 1.3 in a laminar flow. Laminar flow generates shear forces on the piston 1.1 and cylinder 1.3 resulting in conversion of kinetic energy of shaft 1.2 movement to heat energy and hence dissipation of the kinetic energy thus slowing piston 1.1 and shaft 1.2 movement. The energy is in part dissipated into the fluid resulting in heating of the fluid. Thermal expansion of the fluid may result.

A pressure balancing valve 10 addresses a pressure differential across the annulus 1.10 by opening a fluid volume or volumes (P1 and/or P2) to a third pressure equalizing ($P_e$) volume allowing the flow of fluid between the lower pressure volume of P1 and P2 and the third pressure equalizing ($P_e$) volume.

Example 2

Figure 2:
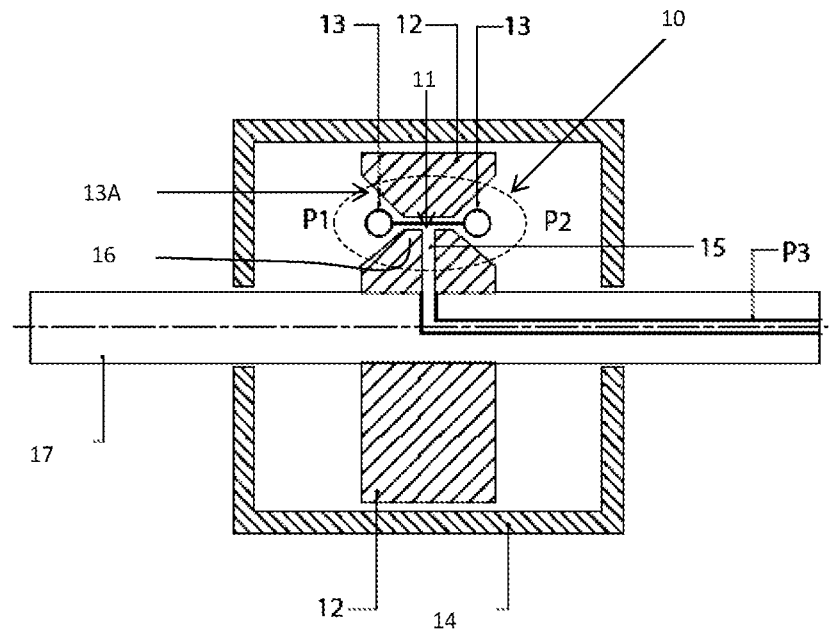
FIG. 2 illustrates schematic detail side cross-section elevation view of the pressure balancing valve used in the first embodiment shown in FIG. 1.

FIG. 2 illustrates a detail cross section of a pressure balancing valve arrangement 10 used in a closed fluid circuit as used in the piston embodiment described in Example 1.

The pressure balancing valve 10 consists of a passage 11 connecting two pressure cavities P1 and P2 on opposite sides of a piston head 12 extending through a cylinder 14. The passage 11 contains two opposed ball valves comprising ball bearings 13 which contact valve seat 13A arranged to allow fluid flow from the lower pressure cavity P1 or P2 into the passage 11. In this way, the ball 13 valves oppose flow from the pressure cavities P1 or P2 into the passage 11. The ball bearings 13 may move laterally to seal one side P1 or P2 and leave open the other side.

The two ball bearings 13 are separated by a hollow pin 16 of sufficient length to ensure only one ball 13 can be seated onto valve seat 13A at a given time. The pin 16 is hollow in a manner to allow fluid through the passage 11 and to allow pressure equilibration through the pin 16.

A second passage 15, inside the piston head 12 and shaft 17, connects the first passage 11 to a third pressure cavity in the form of an accumulator (P3) which provides makeup fluid as required by the pressure cavities P1, P2 either side of the piston head 12. The second passage 15 also allows pressure in the connected piston cavity P1 or P2 and accumulator P3 to balance. By this mechanism pressure in the connected P1 or P2 or both P1 and P2 chambers can equilibrate with the pressure in the accumulator P3.

Figure 3:
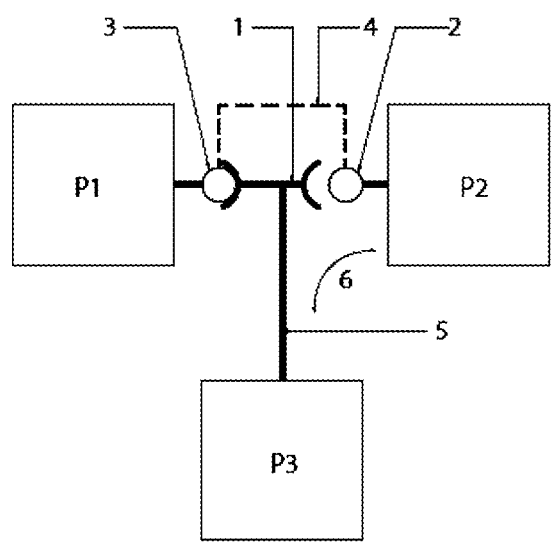
FIG. 3 illustrates a schematic pressure flow arrangement according to one embodiment with fluid flow open between chambers P2 and P3.

Referring to FIG. 3, the valve is shown schematically with the left ball 3 seated, the accumulator P3 is connected to the right side of the piston P2 (i.e. the passage between P1 and P3 is closed); and, with the right ball 2 seated, the accumulator P3 is connected to the left side of the piston P1 (i.e. the passage between P1 and P3 is open).

The position of the balls 2, 3 may be controlled by pressure, flow and/or inertia or by a combination of all of these factors. Fluid flow from the 'drive' (pressure) side P1 of the piston (not shown) into the accumulator P3 via the passage 5 is halted by the ball valve 3, under pressure. Fluid flow from the 'driven' (low pressure) side P2 of the piston and the accumulator P3 is opened 6. The open valve side of the piston P2 is then free to equilibrate changes in fluid volume and pressure via the accumulator P3.

In this way the valve 10 is able to accommodate a fluid pressure differential 4 across P1 and P2 from the working cycle to the accumulator P3, thereby avoiding both over and under pressure of the closed hydraulic circuit.

Figure 4:
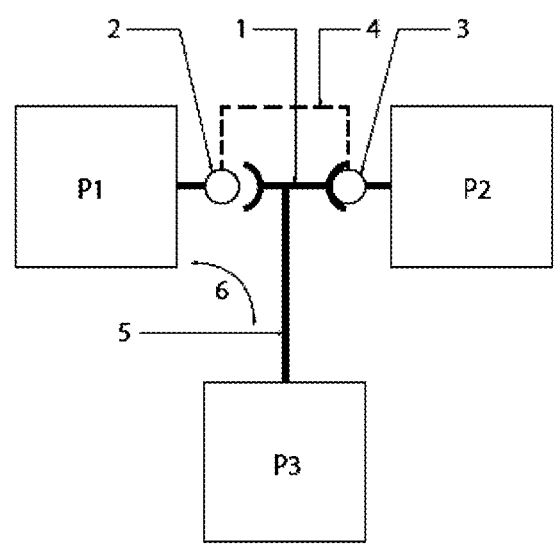
FIG. 4 illustrates an alternative schematic arrangement to FIG. 3, with fluid flow open between chambers P1 and P3.

On a reversal of the pressure gradient 4 (on a reverse movement of the piston), pressure equalization occurs between P1 and P3 as a result of the ball 2 being open and ball 3 closing fluid communication between P2 and P3 as shown in FIG. 4 allowing equilibration of fluid volume and pressure between P1 and P3.

Example 3

An alternate arrangement to that of FIG. 2 is use of a moving piston installation. By putting pressure ports in the piston shaft, the valve arrangement can be accommodated in the piston shaft. With external ports in the cylinder, the valve may be fitted external to the cylinder tube.

Example 4

The interlock between the two check valves may take several forms. In one example, the interlock may be connected to the check valves so they close and open in unison. Alternatively, the interlock may comprise unconnected check valves spaced so they close and open in unison but open independently of each other. The interlock may further be varied so that a check valve stroke can be varied to alter switch phasing.

Aspects of the fluid circuit device have been described by way of example only and it should be appreciated that modifications and additions may be made thereto without departing from the scope of the claims herein.

What is claimed is:

1. A method of controlling pressure variation in working fluids in a fluid circuit undergoing working pressure variation, the method comprising:
    selecting a fluid circuit device, wherein the fluid circuit device is configured to be integrated into an energy absorption apparatus, wherein the energy absorption apparatus is a hydraulic cylinder, and wherein the fluid circuit device comprises
        at least one first fluid volume and at least one second fluid volume; and,
        at least one pressure balancing valve in a valve housing, wherein the fluid circuit device is used about a piston comprising opposing sides;
            wherein when the piston moves in a cylinder a pressure change occurs with fluid on one side of the opposing sides of the piston having a higher pressure than fluid on a second side of the opposing sides of the piston; and
            wherein the at least one first fluid volume and the at least one second fluid volume are on either side of the at least one pressure balancing valve operatively linked via a pressure varying relationship, wherein the at least one pressure balancing valve fluidly links the at least one first fluid volume and the at least one second fluid volume with a common third fluid volume;
    in use, when there is a pressure difference between the at least one first fluid volume and the at least one second fluid volume caused by piston movement of the piston, the at least one pressure balancing valve changes position in the valve housing to
        provide a fluid flow path between the common third fluid volume and a lower pressure of either the at least one first fluid volume or the at least one second fluid volume; and
        restrict or close a fluid flow path between the common third fluid volume and the higher pressure of either the at least one first fluid volume or the at least one second fluid volume;
            wherein, in an event of a low or no pressure gradient between the at least one first fluid volume and the at least one second fluid volume, the at least one pressure balancing valve permits connection between the at least one first fluid volume and the at least one second fluid volume via the common third fluid volume, thereby allowing equilibration of pressure across all volumes in the fluid circuit device;
            wherein the at least one pressure balancing valve comprises an elongated pin element with pin ends, either pin end of said pin ends of said elongated pin element contacting a seal that restricts or closes the fluid flow path; and
            wherein said at least one pressure balancing valve comprises a hydraulic cylinder valve located across different sides of the piston in the hydraulic cylinder and flow of the fluid from either side of the piston or chamber into a fluid accumulator is directed by the hydraulic cylinder valve, allowing pressure to build up on a closed valve side of the piston and relieving a vacuum on a low pressure open side of the hydraulic cylinder valve;
    integrating the fluid circuit device into an apparatus configured to undergo pressure variation.

2. The method of claim 1 wherein the common third fluid volume is an accumulator.

3. The method of claim 1 wherein the at least one pressure balancing valve actuates, on application of a pressure gradient relative to the at least one first fluid volume and the at least one second fluid volume via a first volume changing movement, to connect the common third fluid volume and said at least one first fluid volume having a low pressure and, approximately in unison, also restrict or close connection to said at least one second fluid volume having a relatively higher pressure; and,
    in an event of a reversed pressure gradient imposed via a reversed volume changing movement relative to the at least one first fluid volume and the at least one second fluid volume, a connection between the common third fluid volume and the at least one first fluid volume is restricted or closed and, approximately in unison, a connection is made between the at least one second fluid volume and the common third fluid volume; and,
    wherein valve movement at least partially equalizes the pressure gradient between the lower pressure of either the at least one first fluid volume and the at least one second fluid volume via the common third fluid volume.

4. The method of claim 3 wherein the first volume changing movement is a linear stroke movement.

5. The method of claim 1 wherein the elongated pin element is located in said valve housing and, in an event of a pressure differential between the at least one first fluid volume and the at least one second fluid volume, the elongated pin element travels within the valve housing to either end of the valve housing causing the pin ends to contact a first seal and a second seal located at either end of the valve housing, the first seal being in fluid communication with the at least one first fluid volume and the second seal being in fluid communication with the at least one second fluid volume thereby opening access between the at least one first fluid volume or the at least one second fluid volume and the common third fluid volume and, approximately in unison, restricting or closing fluid communication between an alternate of the at least one first fluid volume or the at least one second fluid volume and the common third fluid volume.

6. The method of claim 5 wherein the first seal and the second seal are located at either extent of the valve housing.

7. The method of claim 5 wherein the first seal and the second seal have a check valve arrangement.

8. The method of claim 5 wherein the at least one pressure balancing valve is urged to a neutral position to allow fluid access between the common third fluid volume and both the at least one first fluid volume and the at least one second fluid volume until sufficient force is applied against the elongated pin element to overcome an urging force.

9. The method of claim 1 wherein the at least one pressure balancing valve comprises a single pressure balancing valve, wherein the single pressure balancing valve comprises said elongated pin element.

10. The method of claim 1 wherein the energy absorption apparatus is a viscous damper used to absorb seismic energy in a building or structure.

11. The method of claim 1 wherein the fluid circuit device is a closed circuit device.

12. The method of claim 5 wherein the first seal and the second seal have a ball valve arrangement.

13. The method of claim 1 wherein valve movement is driven at least in part by inertia change.

14. The method of claim 5 wherein the at least one pressure balancing valve comprises at least one bias imposed on the elongated pin element or the first seal and the second seal to urge the at least one pressure balancing valve to a neutral position to open access to the at least one first fluid volume and the at least one second fluid volume until sufficient force is applied against the elongated pin element or the first seal and the second seal caused by the piston movement to overcome a bias force.

15. The method of claim 5 wherein at an interface between the at least one pressure balancing valve and at least one first or at least one second chamber, one or more of the first seal and the second seal is a compression face seal.

16. The method of claim 1 wherein the at least one first fluid volume and the at least one second fluid volume are on opposite sides of the piston.

17. A method of controlling pressure variation in working fluids in a fluid circuit undergoing working pressure variation, the method comprising:

selecting a fluid circuit device, wherein the fluid circuit device is configured to be integrated into an energy absorption apparatus, and wherein the fluid circuit device comprises at least one first fluid volume and at least one second fluid volume; and at least one pressure balancing valve in a valve housing, wherein the fluid circuit device is used about a piston comprising opposing sides;

wherein when the piston moves in a cylinder a pressure change occurs with fluid on one side of the opposing sides of the piston having a higher pressure than fluid on a second side of the opposing sides of the piston; and wherein the at least one first fluid volume and the at least one second fluid volume are on either side of the at least one pressure balancing valve operatively linked via a pressure varying relationship, wherein the at least one pressure balancing valve fluidly links the at least one first fluid volume and the at least one second fluid volume with a common third fluid volume;

in use, when there is a pressure difference between the at least one first fluid volume and the at least one second fluid volume caused by piston movement of the piston, the at least one pressure balancing valve changes position in the valve housing to provide a fluid flow path between the common third fluid volume and a lower pressure of either the at least one first fluid volume or the at least one second fluid volume; and restrict or close a fluid flow path between the common third fluid volume and the higher pressure of either the at least one first fluid volume or the at least one second fluid volume;

wherein, in an event of a low or no pressure gradient between the at least one first fluid volume and the at least one second fluid volume, the at least one pressure balancing valve permits connection between the at least one first fluid volume and the at least one second fluid volume via the common third fluid volume, thereby allowing equilibration of pressure across all volumes in the fluid circuit device; and wherein the at least one pressure balancing valve comprises an elongated pin element with pin ends, either pin end of said pin ends of said elongated pin element contacting a seal that restricts or closes the fluid flow path; and integrating the fluid circuit device into an apparatus configured to undergo pressure variation;

wherein the elongated pin element is located in said valve housing and, in an event of a pressure differential between the at least one first fluid volume and the at least one second fluid volume, the elongated pin element travels within the valve housing to either end of the valve housing causing the pin ends to contact a first seal and a second seal located at either end of the valve housing, the first seal being in fluid communication with the at least one first fluid volume and the second seal being in fluid communication with the at least one second fluid volume thereby opening access between the at least one first fluid volume or the at least one second fluid volume and the common third fluid volume; and, approximately in unison, restricting or closing fluid communication between an alternate of the at least one first fluid volume or the at least one second fluid volume and the common third fluid volume;

wherein the at least one pressure balancing valve is located across the opposing sides of the piston.

* * * * *